United States Patent
Jain et al.

(10) Patent No.: US 7,320,114 B1
(45) Date of Patent: Jan. 15, 2008

(54) METHOD AND SYSTEM FOR VERIFICATION OF SOFT ERROR HANDLING WITH APPLICATION TO CMT PROCESSORS

(75) Inventors: Prashant Jain, Sunnyvale, CA (US); Kenneth K. Chan, Saratoga, CA (US); Kumarasamy Palanisamy, Sunnyvale, CA (US); Chishein Ju, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 340 days.

(21) Appl. No.: 11/049,990

(22) Filed: Feb. 2, 2005

(51) Int. Cl.
*G06F 17/50* (2006.01)
*G06F 11/00* (2006.01)
*G01R 31/28* (2006.01)

(52) U.S. Cl. .................. 716/4; 716/5; 714/47; 714/728
(58) Field of Classification Search ................ 716/4–5; 714/47, 701, 728, 739, 746, 758, 761
See application file for complete search history.

(56) References Cited

U.S. PATENT DOCUMENTS

| | | | |
|---|---|---|---|
| 5,944,842 A | * | 8/1999 | Propp et al. ................. 714/701 |
| 6,983,414 B1 | * | 1/2006 | Duschatko et al. ......... 714/782 |
| 2004/0034820 A1 | * | 2/2004 | Soltis et al. .................. 714/47 |
| 2005/0172196 A1 | * | 8/2005 | Osecky et al. .............. 714/746 |

* cited by examiner

*Primary Examiner*—Paul Dinh
(74) *Attorney, Agent, or Firm*—Martine Penilla & Gencarella, LLP (57) ABSTRACT

A method provides for verifying soft error handling in an integrated circuit (IC) design. A diagnostic program is executed on a virtual IC based on the IC design using a simulator. A soft error is injected into the virtual IC to trigger hardware error correction in the virtual IC and a software exception. A record of a type and a location of the soft error at the time of the injecting is created. The error log generated by hardware error correction is then compared with the record of injected error, the hardware error correction being part of the virtual IC. An IC design flaw is indicated when a discrepancy exists between the error log and the record of the injected error.

18 Claims, 5 Drawing Sheets

METHOD AND SYSTEM FOR VERIFICATION OF SOFT ERROR HANDLING WITH APPLICATION TO CMT PROCESSORS

BACKGROUND OF THE INVENTION

1. Field of the Invention

The present invention relates generally to verifying soft error handling in integrated circuit designs. Specifically, the present invention provides a system and method for verification of soft error handling using a diagnostic program run in an integrated circuit simulator.

2. Description of the Related Art

Various subcircuits in microprocessors such as register files and memory buffers store data subject to corruption by soft errors. Soft errors occur when ionizing radiation causes a node in a memory array to invert is logical value. Most hardware has embedded logic to detect, correct and log such errors and notify the software of such an event through exceptions. Instruction set simulators (ISS) are often used to verify the proper functioning of the chip in conjunction with the virtual IC described below which models the physical implementations of the chip. However, an ISS or reference architecture cannot easily model soft error events because they are not always coupled with a specific instruction and because of their inherently random nature. This presents a challenge in verifying hardware functionality pertaining to detection, correction, and logging of such errors, referred to collectively herein as soft error handling.

Typically, the hardware logic associated with soft error handling is verified with short directed self-checking tests. Such directed tests involve testing a very specific error type in a diagnostic program, e.g., just one instruction cache error, and comparing expected results with the actual error log generated by the soft error handling logic. This approach is not adequate for chip multi-threading (CMT) processors because of the presence of multiple concurrent threads, which could be executing completely independent programs. Here, the proper error handling by the error encountering thread could be hampered by events on other threads. Furthermore, an error on one thread could "leak" to another thread causing spurious logging or functional incorrectness. For example, if a thread sees an error which is then improperly reported to a different thread, the second thread will behave as if the error occurred during the execution of its own program, potentially resulting in data corruption. Thus, there exists an unmet and heretofore unidentified need for a robust and reliable means for testing soft error handling in microprocessors, and in particular, CMT processors.

SUMMARY OF THE INVENTION

Broadly speaking, the present invention fills these needs by providing a system and method for verification of soft error handling in a microprocessor design.

It should be appreciated that the present invention can be implemented in numerous ways, including as a process, an apparatus, a system, a device, or a method. Several inventive embodiments of the present invention are described below.

One embodiment provides a method for verifying soft error detection and correction in an integrated circuit (IC) design. A diagnostic program is executed on a virtual IC based on the IC design using a simulator. A soft error is injected into the virtual IC to trigger hardware error correction in the virtual IC and a software exception is taken. A record of a type and a location of the soft error is created at the time of the injection. The error log generated by hardware error correction is then compared with the record of injected error, the hardware error correction being part of the virtual IC. An IC design flaw is indicated when a discrepancy exists between the error log and the record of the injected error.

Another embodiment provides a method for validating soft error detection and correction in a design for an integrated circuit (IC). A computer diagnostic program generator is executed to generate a diagnostic program, the diagnostic program comprising a plurality of randomly generated instructions interspersed with error directives. The diagnostic program is compiled to generate an executable diagnostic program. The diagnostic program is executed on a virtual IC based on the design.

Yet another embodiment provides a diagnostic program generator comprising computer code. The diagnostic program generator generates a diagnostic program. The diagnostic program comprises a plurality of randomly generated instructions interspersed with error directives. Each error directive comprises an instruction causing a soft error to be injected into a virtual integrated circuit (IC) when the virtual IC executes the diagnostic program, and a statement creating a record of the error type and location. The diagnostic program further comprising an exception handler to compare the exception with the record to ensure that they are consistent.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

Figure 1:
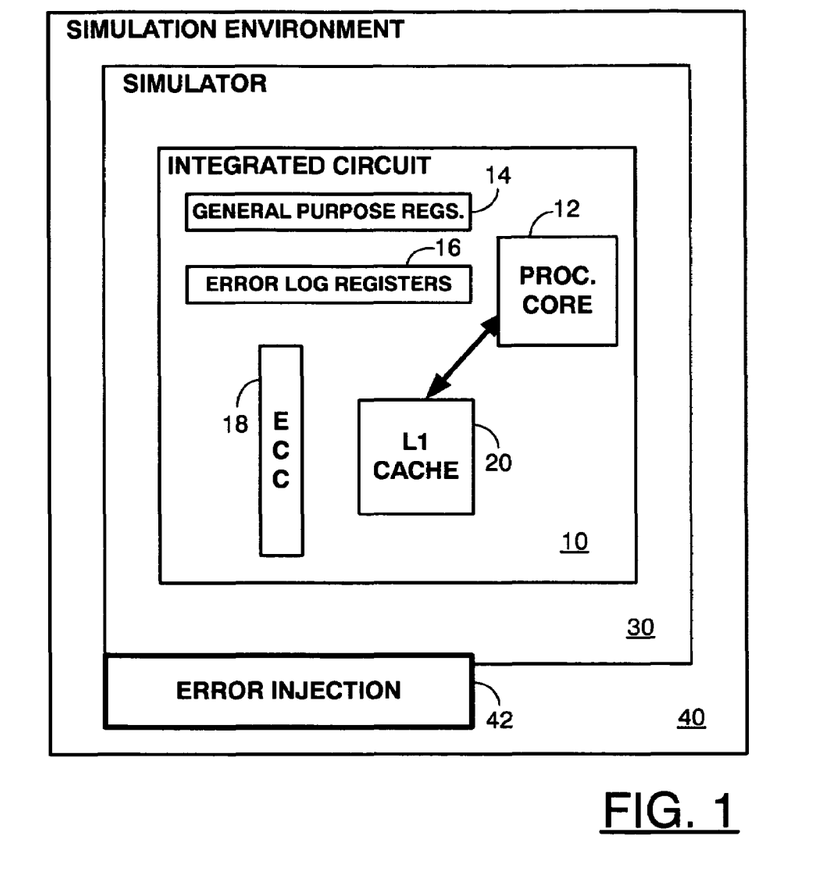
FIG. 1 is a schematic of an exemplary system and microprocessor design to illustrate a system and environment for an exemplary soft error handling verification method and system.

FIG. 1 is a schematic of an exemplary system and microprocessor design to illustrate a system and environment for an exemplary soft error handling verification method and system. Simulation environment 40 is a software and hardware platform executing a software simulator 30 that simulates the operation of an integrated circuit (IC) design 10. Simulation environment 40 may also include other tools and environmental variables that control or modify the operation of simulator 30. Specifically, error injection module 42 provides a mechanism by which soft errors can be injected in IC design 10 during simulation.

Simulator 30 receives an IC design 10 and mimics the behavior of an actual integrated circuit based on the design. Thus, a software model of the integrated circuit design 10 is received and is maintained by simulator 30. In other words, simulator 30 operates a virtual IC based on IC design 10.

Figure 2:
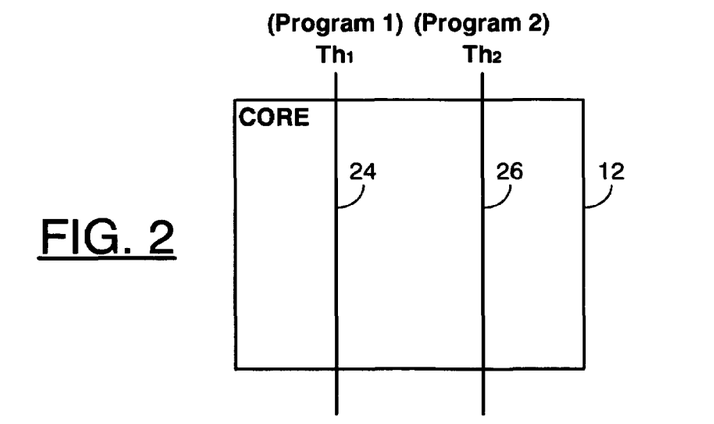
FIG. 2 is a schematic of an exemplary multi-threading processor core.

An exemplary IC design 10 shows a processor core 12, a plurality of general purpose registers 14, a plurality of error log registers 16, an error correction circuit 18, an L1 cache 20. Error correction circuit 18 comprises error handling logic described in more detail below. Note that these elements are exemplary and an actual IC will generally contain many more components not mentioned here. Such components may include, but are not limited to, an IO interface a memory management unit, a second L2 cache, and various communication busses providing communication. It is also possible that IC design 10 will include a plurality of processor cores 12 and each processor core will have an associated L1 cache, ALU, etc. As illustrated in FIG. 2, each processor core 12 may be capable of executing a first thread 24 and a second thread 26. Furthermore, the processor core 12 may be capable of executing any number of threads, e.g., 4 or more threads. For purposes of illustration, however, the embodiments will generally be described with reference to one or two threads.

Figure 3:
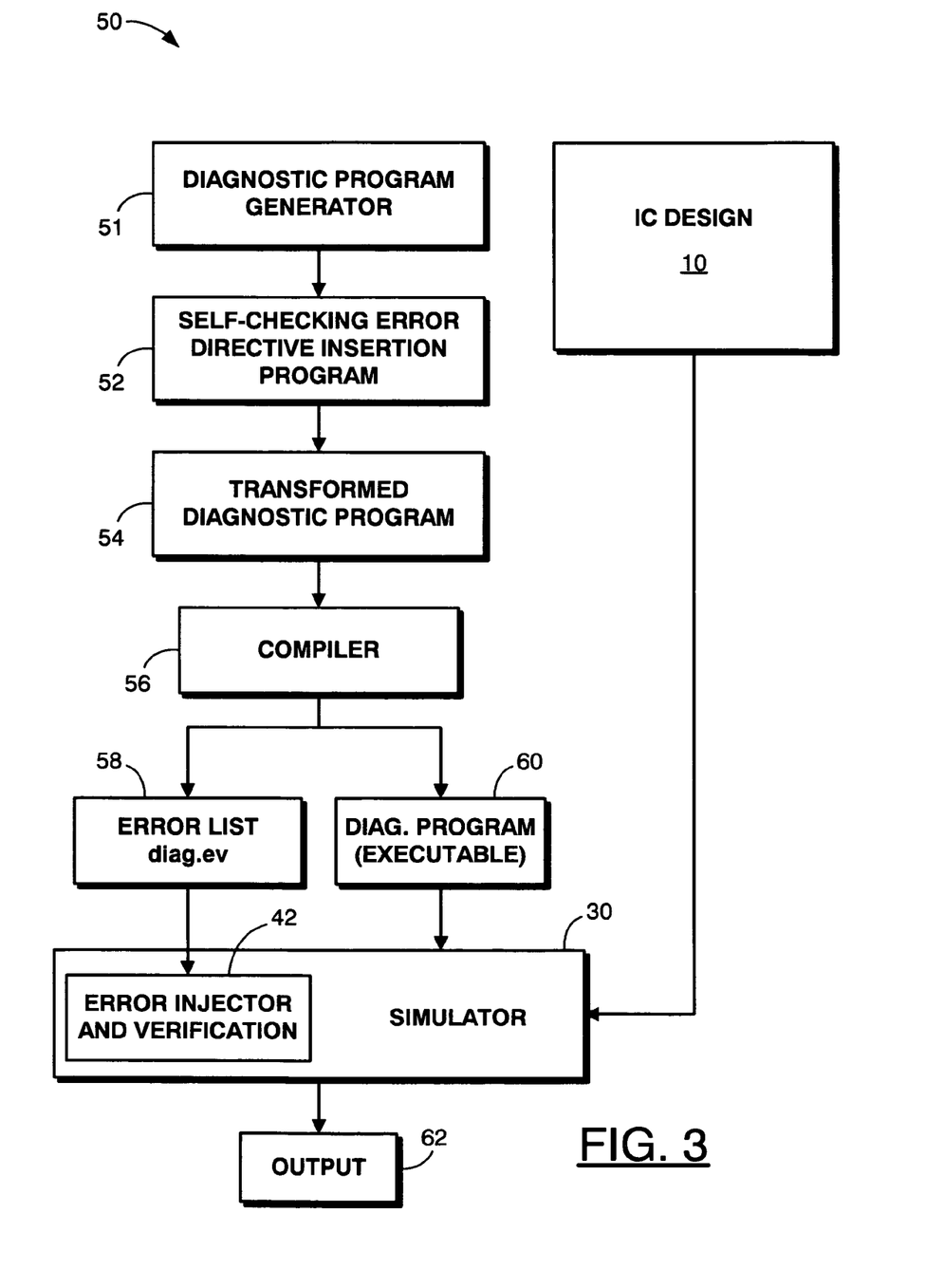
FIG. 3 is a process schematic illustrating the dependencies of the various components of an exemplary soft error handling verification method and system that are used or are generated prior to simulation.

FIG. 3 presents an overview of the dependencies of the various components of an exemplary embodiment for soft error detection and correction verification. Diagnostic program generator 52 is an executable computer program that generates diagnostic programs.

Self-checking insertion program 51 is another executable computer program that transforms the diagnostic program generated by diagnostic program generator 52 into one that has error injection directives. In this embodiment, self-checking insertion program 51 and diagnostic program generator 52 are very tightly coupled and run as a single program; but for purposes of illustration have been depicted as two separate entities in FIG. 3.

Figure 4A:
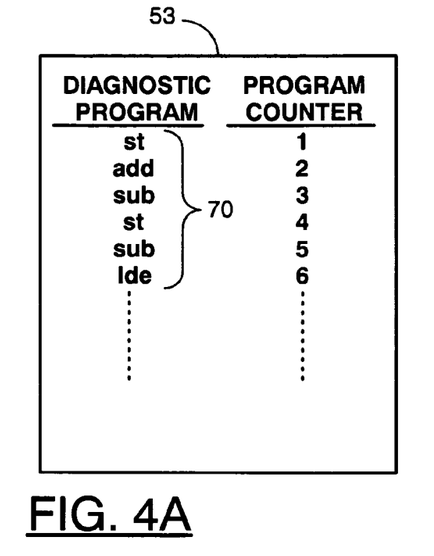
FIG. 4A is a code sample of an exemplary random diagnostic program prior to transformation insertions.
Figure 4B:
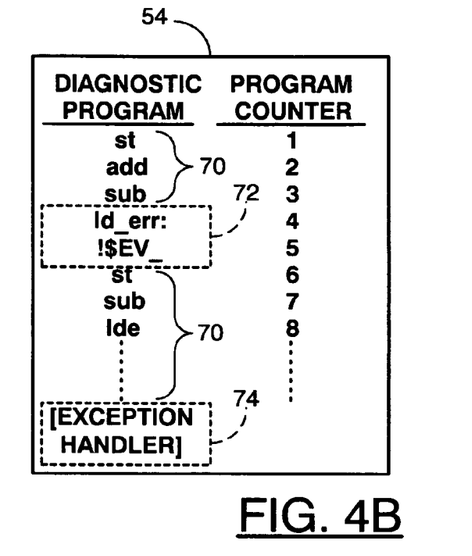
FIG. 4B is the code sample of FIG. 4A after exemplary transformation insertions.

Referring to FIGS. 1, 3, 4A, and 4B, diagnostic program generator 51 generates a diagnostic program 53 comprising a series of assembly language instructions that are randomly generated. Self-checking error directive insertion program 52 transforms diagnostic program 53 into transformed diagnostic program 54. FIG. 4B shows an exemplary transformed diagnostic program 54 created by transforming first diagnostic program 53. Transformed diagnostic program 54 includes transformation insertions comprising one or more error injection directives 72 and an exception handler 74. Error injection directives 72 each comprise several program instructions and serve essentially two functions. The first function is to cause a specific bit to be inverted that should be recognized by error handling logic of IC 10 when executing the next instruction. The second is to record, e.g., in a designated general purpose register 14 the location of the erroneous bit. This record will be compared with the error detected by error correction circuit 18, which is logged in error log register 16 by exception handler 74 (FIG. 4B).

The operation of the error directives and exception handler will be described in further detail below with reference to FIGS. 5 and 6.

Returning to FIG. 3, transformed diagnostic program 54 thus comprises a plurality of random instructions interspersed with error directives. The error directives instruct the simulator to inject a soft error at a certain location, which is randomly determined by self-checking error directive insertion program 52. A compiler 56 reads the transformed diagnostic program 54 and generates an executable diagnostic program 60 and an error list 58. Error list 58 is essentially a data file "diag.ev" that includes a list of error events to be triggered when a specific instruction in the diagnostic program is executed. The error events each include the identity of a particular bit in IC design 10 to be inverted and a program counter number corresponding to the position in executable diagnostic program 60.

Simulator 30 receives IC design 10 and simulates the behavior of IC design 10 when executing executable diagnostic program 60. Thus, simulator 30 causes a virtual IC based on IC design 10 to load and run executable diagnostic program 60. When an instruction corresponding to the program counter number of an error in error list 58 is encountered by simulator 30, error injector module 42, using information in error list 58, causes the specific bit identified by the error directive to invert. Upon execution of the following instruction, the hardware should recognize the error, log the error, correct the error, and trigger an exception causing exception hander 74 (FIG. 4B) of executable diagnostic program 60 to run. The exception handler, as will be described in greater detail below, will verify that the hardware properly handled the error.

The system is therefore able to test soft error handling of a virtual IC based on IC design 10, thereby ensuring it correctly detects and corrects errors or identifying specific problems. Output 62 is provided by simulator 30 and indicates whether the soft errors were appropriately handled or not. When the system responds to the errors in an unexpected way, the simulation is shut down and a report indicating the discrepancy is provided. Also available is the complete state of the virtual IC when the discrepancy is noted.

Figure 5:
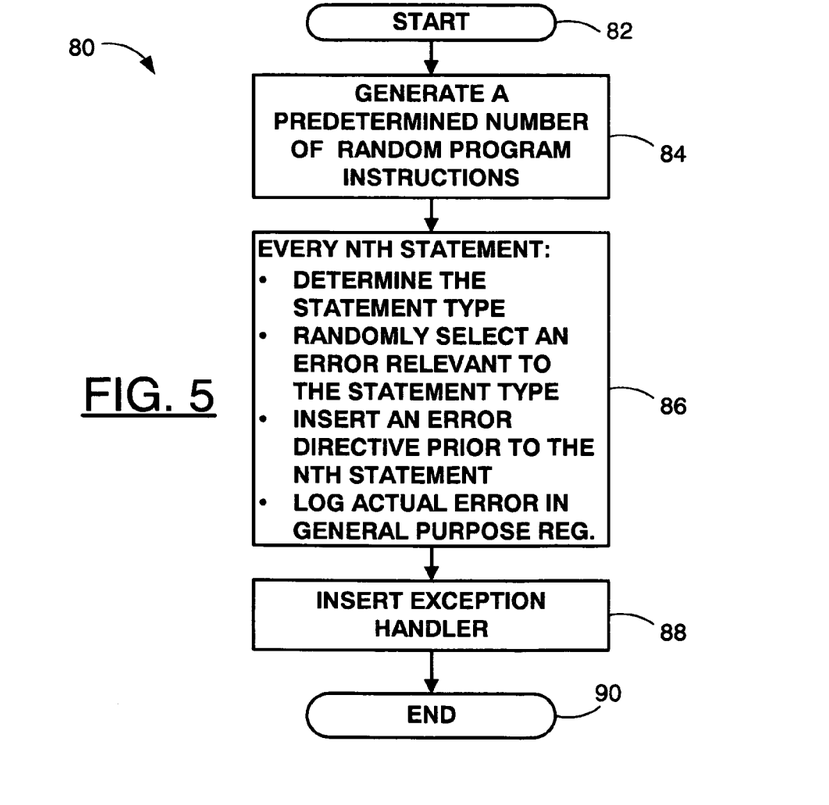
FIG. 5 shows a flow chart depicting an exemplary procedure to transform a diagnostic program to an enhanced diagnostic program that contains the error injection directives.

FIG. 5 shows a flowchart 80 depicting an exemplary operation of diagnostic program generator 52 and the self-checking insertion program 51 running as a single combined entity. The operation starts as indicated by starting block 82 and proceeds to operation 84 wherein a predetermined number of random instructions is generated. In one embodiment, the instructions are in assembly language.

After the program instructions are generated, flowchart 80 proceeds to operation 86. In this operation, self-checking insertion program 51 steps through the random program instructions and prior to every nth instruction, e.g., every 50th instruction, an error injection directive is inserted. The insertion involves first determining the instruction type following the error directive. Then, the type of error to be injected at run time is the general location of the error and is randomly selected from a list of types that the following instruction can encounter. For example, if the nth instruction is a load instruction "ld" then the error is inserted in the buffer from which the instruction is likely to load data. If the next instruction is an "add" then the error type will generate an error in an add register holding an operand value for the addition. Thus, the error type inserted depends on the next instruction executed, but is randomly selected from the error types that the particular instruction can encounter. Once the error type is selected, the error injection directive is actually inserted into the code.

Additionally, a sequence of three to five instructions is inserted to record the expected log values that correspond to the actual error injection directive inserted in a set of predetermined general purpose registers 14 (FIG. 1). The record will include the error status, the error address registers and the number of errors injected. For the last item, the number of errors injected will be equal to the error directive number. Thus, for example, the 5th error directive will indicate that 5 errors have been injected, and this number will be represented in the record.

After the error directives are inserted every n instructions, the procedure in flowchart 80 proceeds to operation 88 wherein an exception handler 74 (FIG. 4B) is appended or otherwise inserted into diagnostic program 54 (FIGS. 3, 4B). Finally, flowchart 80 ends as indicated by ending block 90.

Figure 6:
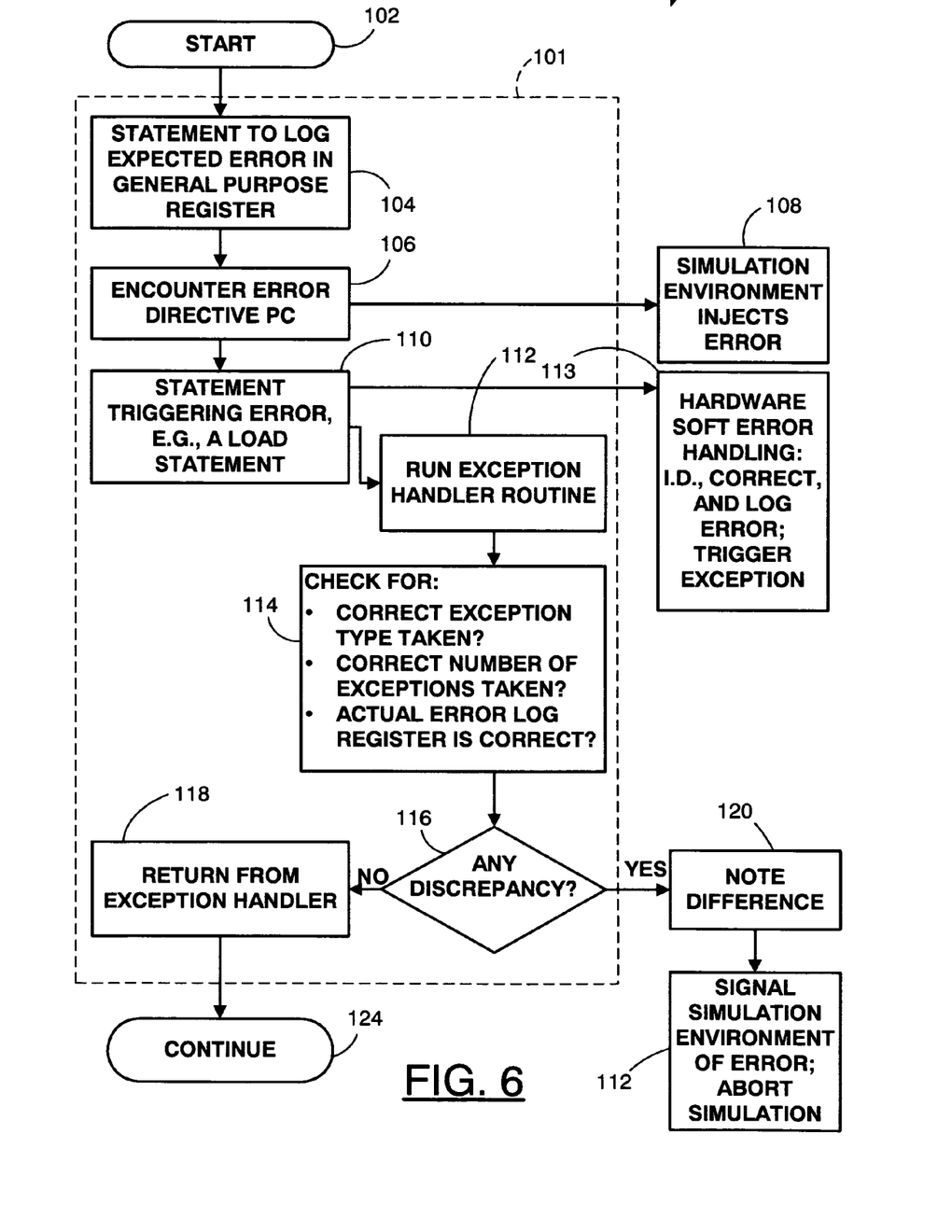
FIG. 6 is a flow chart depicting an exemplary process for testing soft error identification and correction in a processor.

FIG. 6 shows a flowchart 100 depicting an exemplary procedure resulting from the execution of executable diagnostic program 60 by the virtual IC based on IC design 10 in simulator 30 (FIG. 3). Box 101, in FIG. 6, indicates operations performed during simulation of executable diagnostic program 60. Omitted from flowchart 100 is the simulator's response to random instructions 70 (FIG. 4B). The procedure starts as indicated by starting block 102 and flows to operation 104 wherein a sequence of about 3 to 5 instructions is executed which records in general purpose registers 14 (FIG. 1) the expected values of the error logs. As mentioned above, the error records comprise expected values in error log register 16 (FIG. 1) logged by the error handling logic in ECC 18 when error is encountered during simulation. These values include the error address registers and the number of errors injected.

The procedure then flows to operation 106, which occurs when the program counter of the diagnostic program matches the program counter specified in the error injection directive. As mentioned above, this information was captured during compilation of the diagnostic program 54 in the "diag.ev" error list (FIG. 3). Once it is determined that the simulation has reached the program counter where the error injection mechanism of the simulation environment has to be activated, the error injection module 42 (FIGS. 1, 3) injects the particular error specified in the error injection directive by inverting the logical value of a bit in the data that the instruction at that program counter value in simulation is going to use. This operation is represented in flowchart 100 by operation 108.

At this point in the simulation, the diagnostic program has been simulated to where the error has been injected and the expected error logs have been recorded in the predetermined general purpose registers 14. The procedure then flows to operation 110 wherein the next instruction in executable diagnostic program 60 (FIG. 3) that was specified to encounter the error is executed.

In response to encountering the error, the properly functioning virtual IC, in operation 113, identifies the error, corrects the error, logs the error in error log registers 16 (FIG. 1), and triggers a software exception of the particular type consistent with the error type to inform the software that the error occurred. When the exception is triggered, the procedure flows to operation 112 wherein the exception handler 74 (FIG. 4B) is executed. The procedure flows to operation 114, which is defined in the exception handler. The exception handler reads general purpose registers 14 (FIG. 1) containing the record of the error type inserted, error address, and the total number of errors injected. The exception handler compares the exception type triggered by the hardware with the expected exception type which corresponds with the error type recorded in one of the general purpose registers 14. Also, the exception handler compares a running total of the number of exceptions encountered with the expected value also recorded in one of the general purpose registers 14. Finally, the exception handler compares the error type, which indicates where in general the error occurred, e.g., the instruction cache or the data cache, etc., and location of the error (for example, the bit location and/or register number) recorded in a set of general purpose registers 14 against the type and location of the error logged by the error correcting circuit 18 in error log registers 16 (FIG. 1).

If the virtual IC fails to identify the presence of the soft error, then no exception will be taken and the execution continues until the next error directive is encountered. At that point, the failure to recognize the previous soft error will be identified by the discrepancy in the running totals.

The procedure flows to box 116, where if any discrepancies between the values recorded in general purpose registers 14 and the values logged by the hardware in the error log registers 16 are noted, the procedure flows to operation 120 where such discrepancies are notified to the user and then, in operation 122, the simulation is aborted. If, at operation 116, no discrepancy is identified, then the procedure flows to operation 118 wherein the execution returns from the exception handler and continues as indicated by continue block 124.

The method described above is applicable to uniprocessors, which execute only one thread at a time, but has particular advantages when implemented in chip-multi-threading (CMT) processors, for which no technique has previously been available for comprehensive and robust testing of soft error handling. For CMT processors, all threads will run a test program comprising randomly generated instructions as mentioned above. However, a "victim" thread is chosen and all errors are injected only on the victim thread. The victim thread may be chosen randomly, or it may be selected sequentially in a series of tests. The use of a victim thread allows for the testing of any error leakage from one thread to another. Such leakage may occur, for example, when the error correcting logic on the virtual IC improperly notifies a second thread of an error that actually occurred on a first thread. When this happens, the non-victim thread may take an exception, either instead of, or in addition to, the victim thread. To identify this, each non-victim thread checks if its own log is clear and that its trap count is zero at the end of their execution.

Figure 7A:
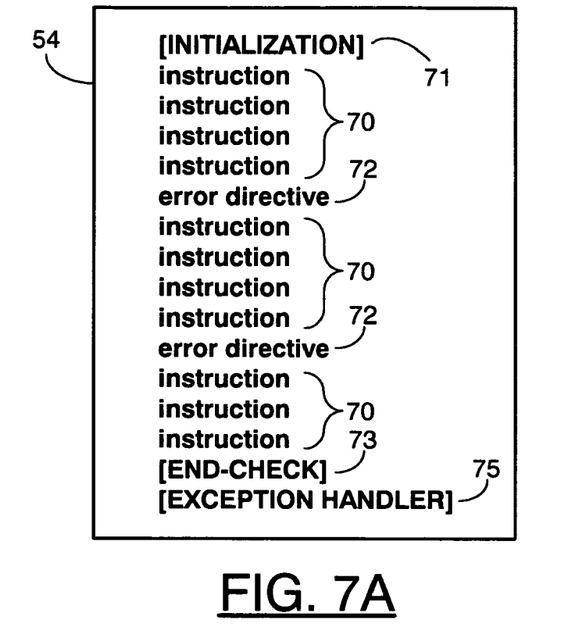
FIGS. 7A and 7B show generic formats of exemplary diagnostic programs for victim and non-victim threads, respectively.
Figure 7B:
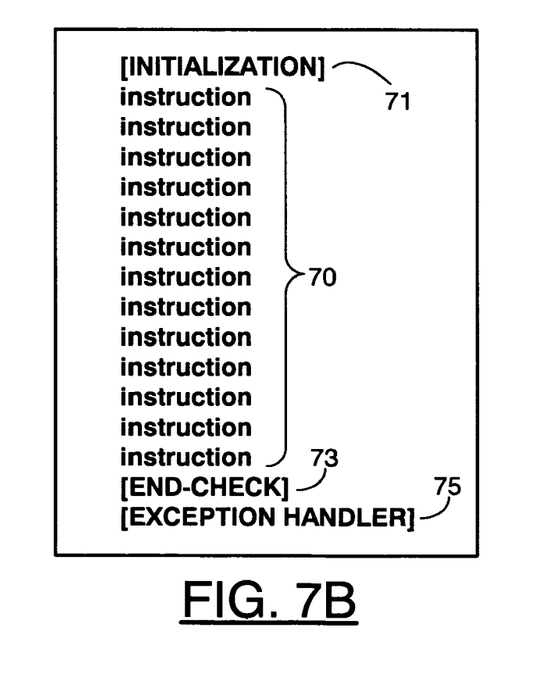

To illustrate, FIGS. 7A and 7B show generic formats of exemplary diagnostic programs for victim and non-victim threads, respectively. For a processor core 12 (FIG. 2) capable of executing two threads 24 and 26 in parallel, one thread is chosen as a victim thread. Diagnostic program 54 (FIG. 7A) is executed on that thread and periodically injects errors into registers affecting that thread only. Meanwhile, the non-victim thread (or threads, if there are more than 2 threads running in parallel) will run diagnostic program 57. Each program includes an initialization section 71, which clears the log registers and error reporting registers, and a series of randomly generated instructions 70. In addition, each program includes an end-check to verify that the logs contain the correct values after the test programs complete. While the victim thread will include an exception handler as described in detail above, the non-victim thread may also have an exception handler to trap exceptions that occur due to design flaws in IC design 10, e.g., an error leak as mentioned above.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Embodiments of the present invention can be processed on a single computer, or using multiple computers or computer components which are interconnected. A computer, as used herein, shall include a standalone computer system having its own processor(s), its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for verifying soft error detection and correction in an integrated circuit (IC) design, the method comprising:
    generating a diagnostic program using a diagnostic program generator that inserts a plurality of random program instructions and periodically inserts an error directive into the diagnostic program, each error directive causing injection of a soft error of a particular type, the type of the soft error being randomly selected by the diagnostic program generator at the time the diagnostic program is generated;
    executing the diagnostic program on a virtual IC based on the IC design using a simulator;
    injecting the soft error into the virtual IC to trigger hardware error correction in the virtual IC and a software exception, the injecting being in response to one of the error directives;
    creating a record, the record including a type of the soft error and a location of the soft error; and
    comparing an error log generated by hardware error correction with the record of injected error, the hardware error correction being part of the virtual IC; and
    identifying an IC design flaw when a discrepancy exists between the error log and the record of the injected error.

2. The method of claim 1 wherein the type of the soft error is randomly selected from a group of error types that, for a properly functioning design, will each be recognized and corrected by the hardware error correction during execution of a following random program instruction.

3. The method of claim 1 wherein the diagnostic program generated by the diagnostic program generator is in assembly language and is subsequently compiled into executable code prior to said executing, the compiler producing an executable diagnostic program and an error list, the error list comprising a plurality of error events, each error event corresponding to one of the error directives and indicating the type of the soft error and a location of the soft error, the error events also each comprising a program counter number corresponding to the location of the corresponding error directive.

4. The method of claim 3 wherein the injecting a soft error is performed by a simulator environment in response to one of the entries in the error list.

5. The method of claim 1 wherein the error directive further comprises an instruction causing the creating of the record.

6. The method of claim 1 wherein the diagnostic program comprises a plurality of randomly generated instructions and an exception handler, the exception handler being executed in response to the software exception, the exception handler performing the comparing and the identifying.

7. The method of claim 1 wherein the record and the error log each additionally include a number of errors injected.

8. A method for verifying soft error detection and correction in an integrated circuit (IC) design for a multi-threading processor capable of executing a plurality of threads at a time, the method comprising:
    executing a diagnostic program on a virtual IC based on the IC design using a simulator;
    injecting a soft error into the virtual IC to trigger hardware error correction in the virtual IC and a software exception;
    creating a record, the record including a type of the soft error and a location of the soft error; and
    comparing an error log generated by hardware error correction with the record of injected error, the hardware error correction being part of the virtual IC;
    identifying an IC design flaw when a discrepancy exists between the error log and the record of the injected error;
    selecting a victim thread from the plurality of threads and performing the injection only in the victim thread,
    executing a non-victim program comprising a random series of instructions in non-victim threads while the victim thread is executing the diagnostic program; and
    monitoring the non-victim threads to ensure that no errors leak from the victim thread to the non-victim thread.

9. The method of claim 8 wherein the non-victim program concludes with a check operable to ensure that error logs associated with the corresponding non-victim thread are clear.

10. The method of claim 8 wherein each of the plurality of threads are selected as the victim thread in one of a random or sequential manner in a series of diagnostic runs.

11. A method for validating soft error detection and correction in a design for an integrated circuit (IC), the method comprising:
  executing a computer diagnostic program generator to generate a diagnostic program, the diagnostic program comprising a plurality of randomly generated instructions interspersed with error directives, the error directives defining a type of a soft error and location for the soft error to occur;
  executing the diagnostic program on a virtual IC based on the design using a simulator; and
  compiling the diagnostic program prior to the executing and generating an error list during the compiling, the error list comprising a list of error events and a program counter numbers each corresponding to one of the error directives, the error list being used by a simulator environment within which the virtual IC is simulated, the simulator environment injecting errors defined by the error event when executing an instruction having a corresponding program counter number.

12. The method of claim 11 wherein the diagnostic program further comprises an exception handler that operates to compare error logs generated by the design when encountering and correcting soft errors with records of the soft errors created by the error directives.

13. The method of claim 11 wherein the diagnostic program is executed on one of a plurality of concurrently executing threads in the virtual IC, the one thread being a victim thread; the method further comprising:
  executing test programs on one or more non-victim threads concurrently with the executing of the diagnostic program, wherein the test programs do not include error directives so that errors are only injected into the victim thread.

14. The method of claim 13 wherein each test programs on the one or more non-victim threads comprises a plurality of randomly generated instructions and an end-check, the end-check operating to check that error logs are for the respective non-victim thread are clear.

15. A diagnostic program generator comprising computer code capable of causing a computer to:
  generate a diagnostic program, the diagnostic program comprising a plurality of randomly generated instructions interspersed with error directives, each error directive comprising an instruction causing a soft error to be injected into a virtual integrated circuit (IC) when the virtual IC executes the diagnostic program, and an instruction creating a record, the record including a type of the soft error and a location of the soft error; and
  inserting an exception handler into the diagnostic program, the exception handler comparing an exception triggered by the soft error with the record to ensure that they are consistent.

16. The diagnostic program generator of claim 15 wherein the exception handler further operates to compare an error log generated by virtual IC with the record of the soft error created by the error directive.

17. The diagnostic program generator of claim 15 wherein the soft error is randomly selected from a group of errors that, for a properly functioning IC design on which the virtual IC is based, will each be recognized and corrected by hardware error correction during execution of a following random program instruction.

18. The diagnostic program generator of claim 15 wherein the exception handler further operates to compare the number of exceptions taken with a number of errors injected, the number of errors injected being recorded by the error directive.

* * * * *